(12) United States Patent
Song et al.

(10) Patent No.: US 8,258,807 B2
(45) Date of Patent: Sep. 4, 2012

(54) COMPUTER SYSTEM ON AND OFF TEST APPARATUS

(75) Inventors: Yong-Jun Song, Shenzhen (CN); Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 426 days.

(21) Appl. No.: 12/722,785

(22) Filed: Mar. 12, 2010

(65) Prior Publication Data
US 2011/0161040 A1    Jun. 30, 2011

(30) Foreign Application Priority Data
Dec. 30, 2009  (CN) .......................... 2009 1 0312584

(51) Int. Cl.
*G01R 31/28* (2006.01)
*G01R 31/02* (2006.01)

(52) U.S. Cl. .................. 324/763.01; 324/537

(58) Field of Classification Search ............. 324/763.01, 324/537, 500, 555; 702/117, 108
See application file for complete search history.

(56) References Cited

U.S. PATENT DOCUMENTS

| | | | | |
|---|---|---|---|---|
| 4,707,657 A * | 11/1987 | Boegh-Petersen | ............ | 324/537 |
| 4,769,596 A * | 9/1988 | Faucett | ............ | 324/557 |
| 4,833,402 A * | 5/1989 | Boegh-Petersen | ....... | 324/755.08 |
| 7,710,123 B2 * | 5/2010 | Xiong | ............ | 324/555 |

* cited by examiner

*Primary Examiner* — Hoai-An D Nguyen
(74) *Attorney, Agent, or Firm* — Altis Law Group, Inc.

(57) ABSTRACT

A computer system on/off test apparatus includes a parameter setting and test control circuit, a test indicating circuit, a voltage converting circuit, and an on/off signal switch circuit. The parameter setting and test control circuit includes a micro control unit (MCU) to set a number of test times and control an on/off test of a motherboard. The test indicating circuit is operable to display the number set by the parameter setting and test control circuit, and display a successful number of test times of the on/off test. The voltage converting circuit is operable to convert a first voltage received from a first standby power connector to a second voltage. The on/off signal switch circuit is operable to switch the first and second voltages according the control by the MCU.

5 Claims, 6 Drawing Sheets

COMPUTER SYSTEM ON AND OFF TEST APPARATUS

BACKGROUND

1. Technical Field

The present disclosure relates to test apparatuses and, particularly, to a computer system on/off test apparatus.

2. Description of Related Art

Because operation speeds of computers continue to accelerate, the stability of computer's motherboards is becoming increasingly important. To ensure stability of the motherboards, the motherboards must pass a series of standard tests. On/off tests, reset tests, and suspend-wake up tests are major tests applied on a computer motherboard before packing. Testing is executed by manually actuating the power and reset switches. However, manual operation not only limits the number of repetitions, but also inefficient and inaccurate. Improvement in the art is needed.

DETAILED DESCRIPTION

Figure 1:
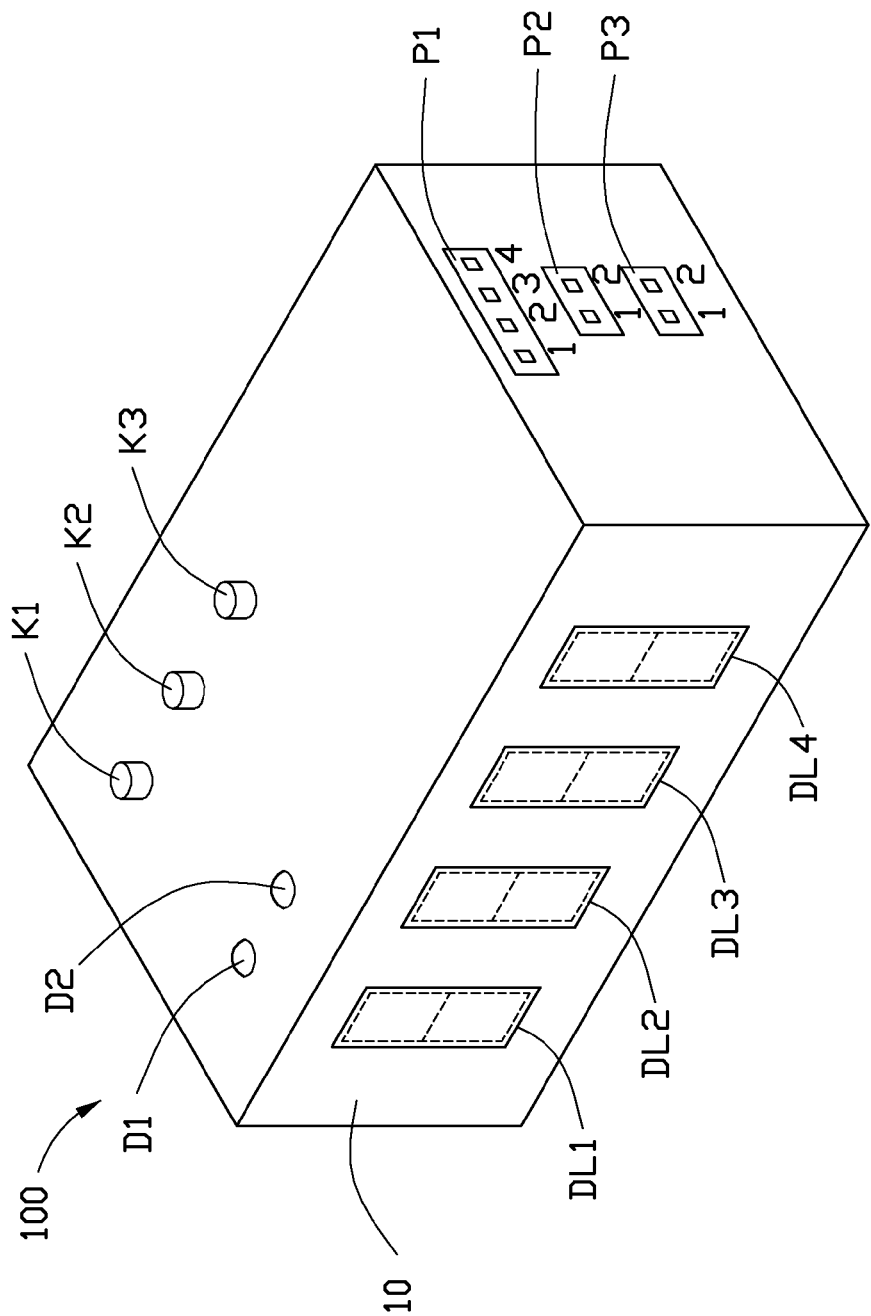
FIG. 1 is an isometric, schematic view of an embodiment of a computer system on/off test apparatus.
Figure 2:
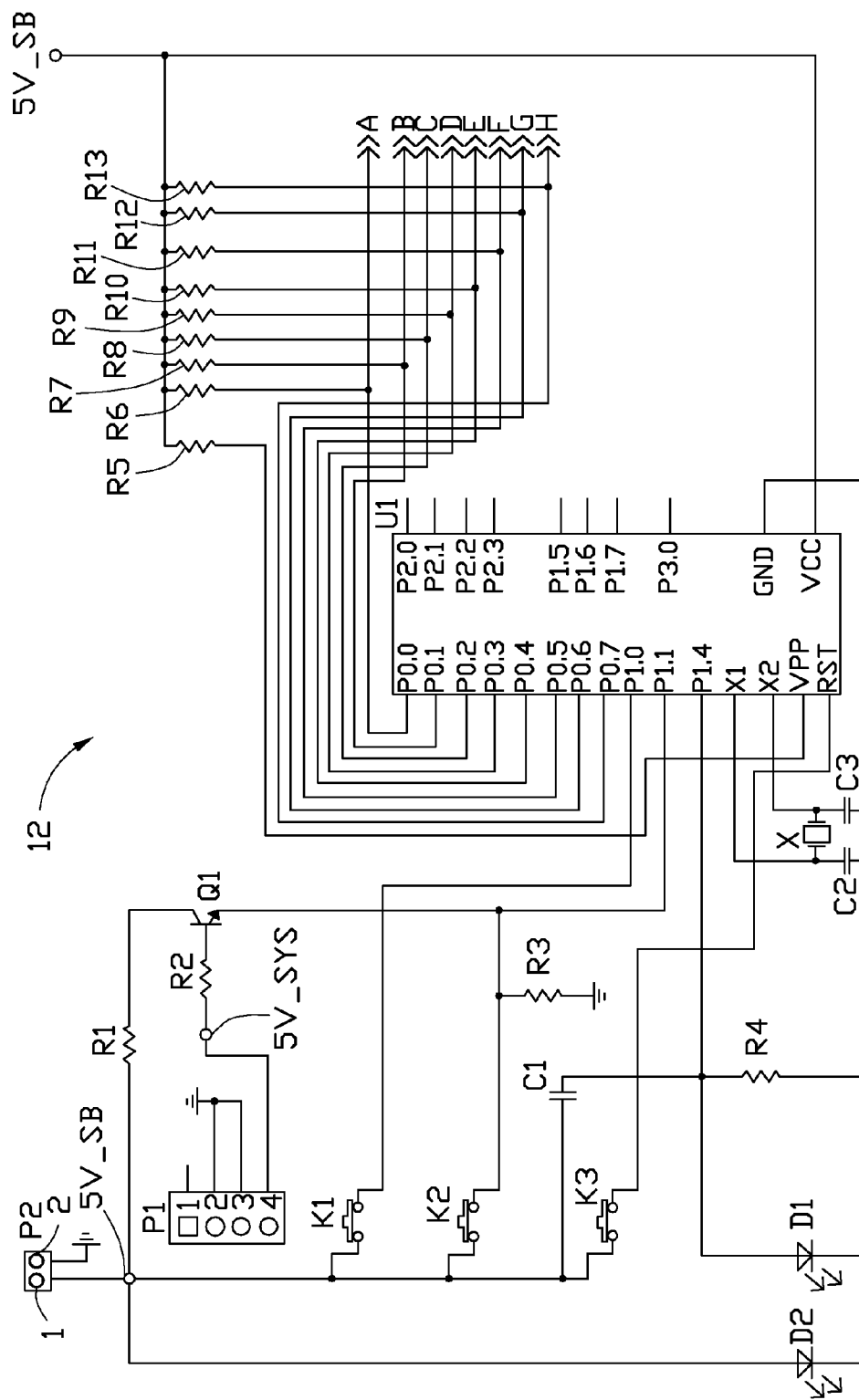
FIGS. 2 to 5 are four parts of a circuit diagram of the computer system on/off test apparatus of FIG. 1.
Figure 3:
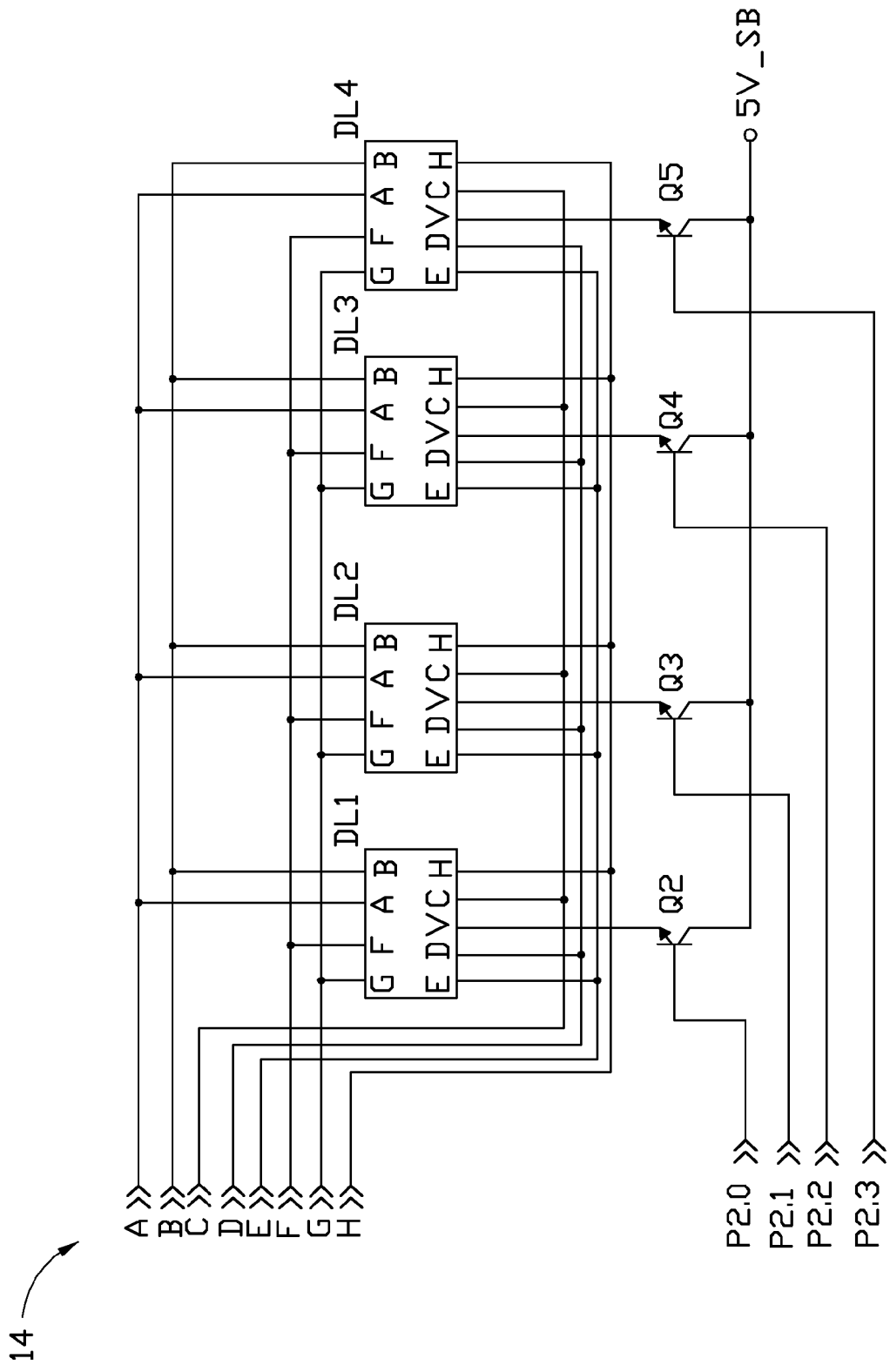
Figure 4:
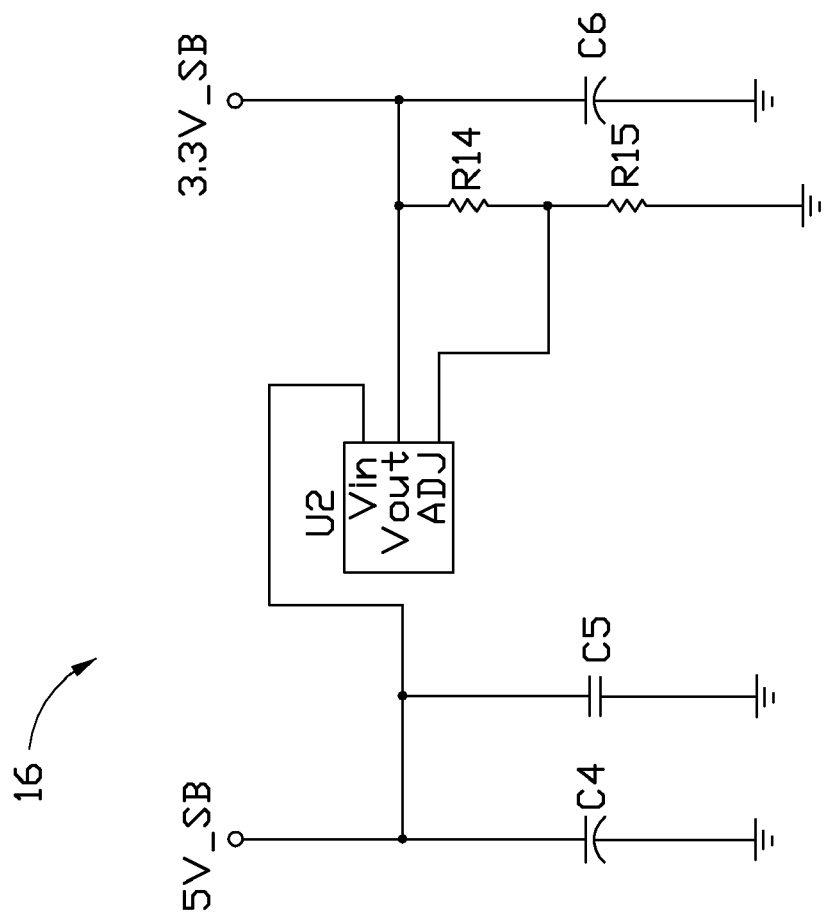
Figure 5:
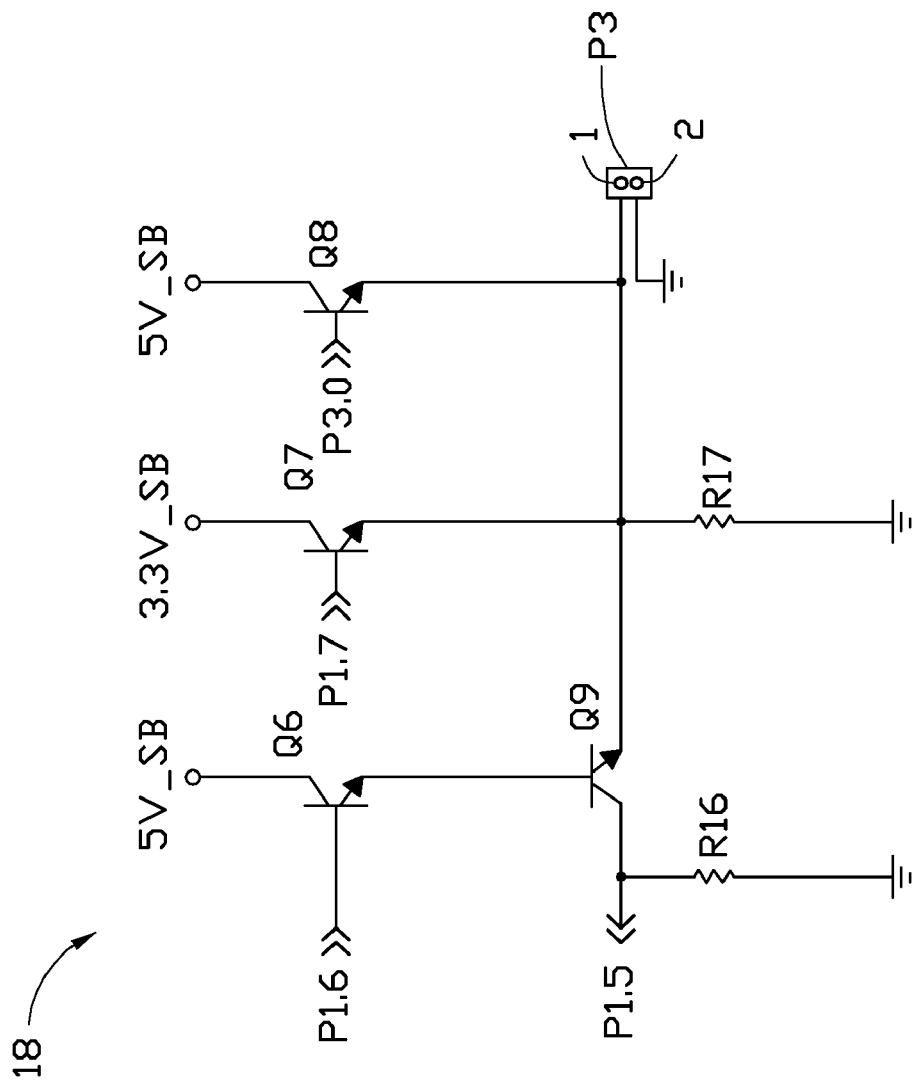

Referring to FIGS. 1 to 5, an embodiment of a computer system on/off test apparatus 100 includes a case 10 and a testing circuit whose elements are arranged in or on the case 10. The testing circuit includes a parameter setting and test control circuit 12, a test indicating circuit 14, a voltage converting circuit 16, and an on/off signal switch circuit 18.

The parameter setting and test control circuit 12 includes a micro control unit (MCU) U1, thirteen resistors R1-R13, three capacitors C1-C3, a crystal oscillator X1, a transistor Q1, first to third key switches K1-K3 mounted on the case 10, first and second light-emitting diodes (LEDs) D1 and D2 mounted on the case 10. A system power connector P1 is mounted on the case 10, and a first standby power connector P2 is mounted on the case 10. In one embodiment, the system power connector P1 is a four-pin power connector and includes two power pins 1 and 4, and two ground pins 2 and 3. The first standby power connector P2 is a two-pin power connector and includes a power pin 1 and a ground pin 2.

A collector of the transistor Q1 is connected to the power pin 1 of the first standby power connector P2 through the resistor R1. A base of the transistor Q1 is connected to the power pin 4 of the system power connector P1 through the resistor R2. An emitter of the transistor Q1 is connected to a data pin P1.1 of the MCU U1. A first terminal of the switch K1 is connected to the power pin 1 of the first standby power connector P2. A second terminal of the switch K1 is connected to a data pin P1.0 of the MCU U1. A first terminal of the switch K2 is connected to the power pin 1 of the first standby power connector P2. A second terminal of the switch K2 is connected to the data pin P1.1 of the MCU U1, and grounded through the resistor R3. A first terminal of the switch K3 is connected to the power pin 1 of the first standby power connector P2. A second terminal of the switch K3 is connected to a reset pin of the MCU U1. An anode of the LED D1 is connected to a data pin P1.4 of the MCU U1. A cathode of the LED D1 is grounded. An anode of the LED D2 is connected to the power pin 1 of the first standby power connector P2. A cathode of the LED is grounded.

A first terminal of the capacitor C1 is connected to the power pin 1 of the first standby power connector P2. A second terminal of the capacitor C1 is connected to the anode of the LED D1, and connected to a ground pin GND of the MCU U1 via the resistor R4. The ground pin GND of the MCU U1 is grounded. Two terminals of the crystal oscillator X1 are connected to two oscillator pins X1 and X2 of the MCU U1, and grounded through the capacitors C2 and C3 respectively. A power pin VCC of the MCU U1 is connected to the power pin 1 of the first standby power connector P2. A power pin VPP of the MCU U1 is connected to the power pin 1 of the first standby power connector P2 through the resistor R5. Data pins P0.0-P0.7 of the MCU U1 are connected to the power pin 1 of the first standby power connector P2 through the resistors R6-R13, respectively. In one embodiment, the MCU U1 is an AT89C51 MCU. Resistances of the resistors R1, R4, and R5-R13 are each about 1 kilohm (K12). Resistances of the resistors R2 and R3 are each about 10 KΩ.

The test indicating circuit 14 includes four seven-segment numeric indicators DL1-DL4 and four transistors Q2-Q5. Data pins A-H of each of the indicators DL1-DL4 are connected to the data pins P0.0-P0.7 of the MCU U1, respectively. Power pins V of the indicators DL1-DL4 are connected to emitters of the transistors Q2-Q5, respectively. Bases of the transistors Q2-Q5 are connected to data pins P2.0-P2.3 of the MCU U1, respectively. Collectors of the transistors Q2-Q5 are connected to the power pin 1 of the first standby power connector P2.

The voltage converting circuit 16 includes a linear regulator U2, two resistors R14 and R15, and three capacitors C4-C6. An input terminal Vin of the regulator U2 is connected to the power pin 1 of the first standby power connector P2, and grounded through the capacitors C4 and C5 in parallel. An output terminal Vout of the regulator U2 is connected to an adjusting terminal ADJ of the regulator U2 through the resistor R14. The adjusting terminal ADJ is grounded through the resistor R15. The output terminal Vout is grounded through the capacitor C6. In one embodiment, the regulator U2 is used to convert a first voltage, such as a 5 volt (V) voltage, to a second voltage, such as a 3.3V voltage.

The on/off signal switch circuit 18 includes four transistors Q6-Q9, two resistors R16 and R17, and a second standby power connector P3 mounted on the case 10. A base of the transistor Q6 is connected to a data pin P1.6 of the MCU U1. A collector of the transistor Q6 is connected to the power pin 1 of the first standby power connector P2. An emitter of the transistor Q6 is connected to a base of the transistor Q9. A base of the transistor Q7 is connected to a data pin P1.7 of the MCU U1. A collector of the transistor Q7 is connected to the output terminal Vout of the regulator U2. An emitter of the transistor Q7 is connected to an emitter of the transistor Q9, grounded through the resistor R17, and connected to a power pin 1 of the second standby power connector P3. A base of the transistor Q8 is connected to a data pin P3.0 of the MCU U1. A collector of the transistor Q8 is connected to the power pin 1 of the first standby power connector P2. An emitter of the transistor Q8 is connected to the power pin 1 of the second standby power connector P3. A collector of the transistor Q9 is connected to a data pin P1.5 of the MCU U1, and grounded through the resistor R16. A ground pin 2 of the second standby power connector P3 is grounded.

Figure 6:
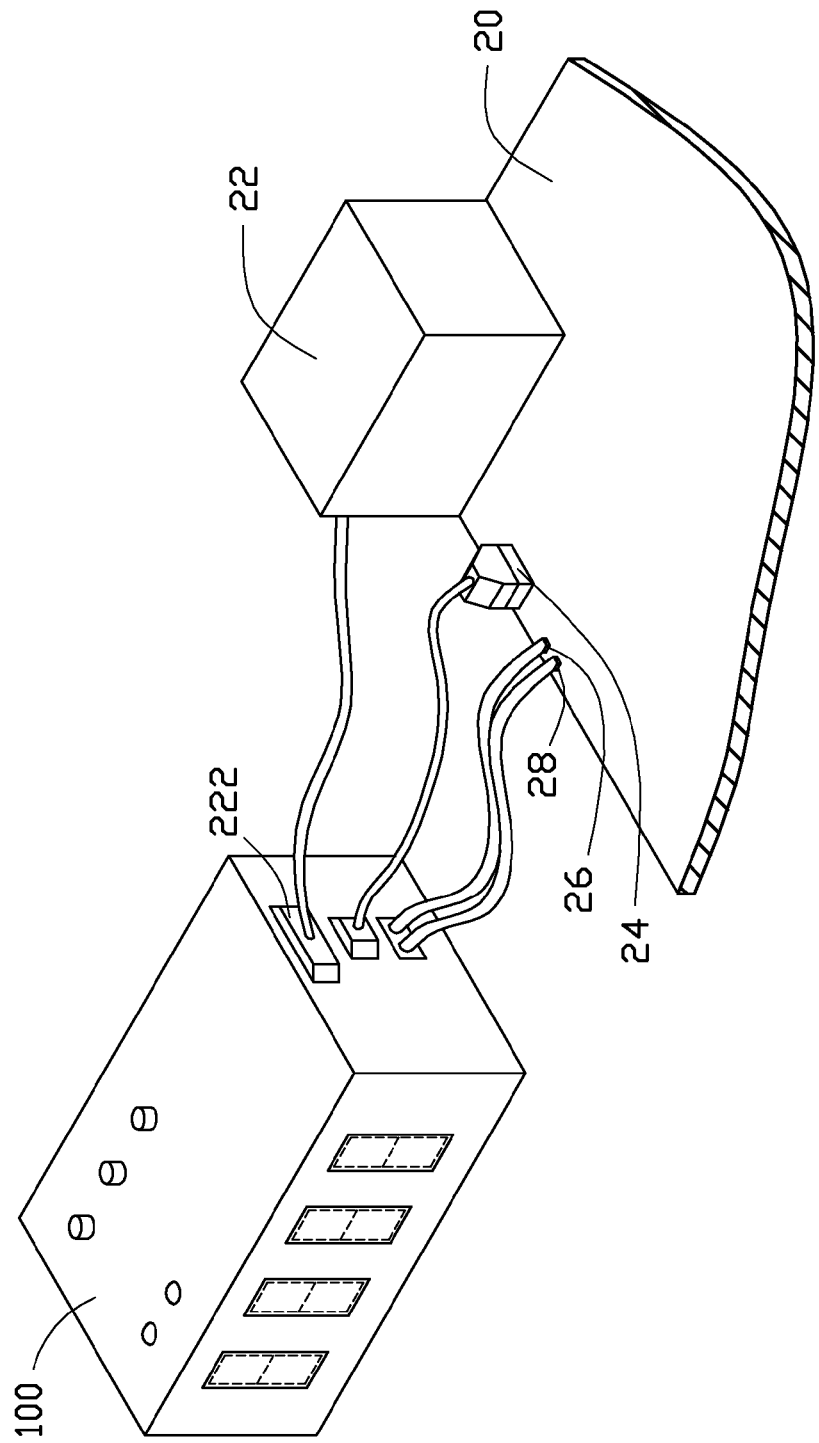
FIG. 6 is an isometric, schematic view of the computer system on/off test apparatus of FIG. 1, together with a motherboard.

Referring to FIG. 6, in use, the computer system on/off test apparatus 100 is connected to a motherboard 20, to execute an on/off test for the motherboard 20. A power connector 222 of a power supply 22 of the motherboard 20 is connected to the system power connector P1, to transfer a 5V system voltage 5V_SYS. A power connector 24 of the motherboard 20 is connected to the first standby power connector P2, to transfer a 5V standby voltage 5V_SB. A power switch pin 26 and a ground pin 28 are connected to the power pin 1 and ground pin 2 of the second standby power connector P3.

After the above preparation, the power supply 22 is connected to an external power source, such as a 110V power source (not shown). At this time, if the motherboard 22 works normally, the power connector 24 outputs the 5V standby voltage 5V_SB, therefore, the LED D2 is turned on. If the motherboard 22 works abnormally, the power connector 24 will not output the 5V standby voltage 5V_SB, therefore, the LED D2 is turned off.

If the LED D2 shines, a number of test times for turning on/off the motherboard 20 is set by pushing the first and the second switches K1 and K2, and the test number is indicated by the indicators DL1-DL4. For example, if the test number needs to be set to "1000," the first key switch K1 needs to be pushed four times, and at the same time, the indicator DL1 is turned on, which means to set a number on a thousand mark. Secondly, the second key switch K2 needs to be pushed one time, and at the same time, the indicator DL1 shows "1", which indicates the thousand mark is set to 1. Lastly, the first key switch K1 needs to be pushed one more time, which means setting the number is complete, and the indicators DL2-DL4 are all turned on, and the indicators DL1-DL4 show "1000." For another example, if the test number needs to be set "560," the first key switch K1 needs to be pushed three times, and at the same time, the indicator DL2 is turned on, which means to set a number at a hundred mark. Secondly, the second key switch K2 needs to be pushed five times, and at the same time, the indicator DL2 shows "5", which means the hundred mark is set to 5. Thirdly, the first key switch K1 needs to be pushed two times, and at the same time, the indicator DL3 is turned on, which means to set a number at a ten mark. Fourthly, the second key switch K2 needs to be pushed six times, and at the same time, the indicator DL3 shows "6", which means the ten mark is set to 6. Lastly, the first key switch K1 needs to be pushed one time, which means setting the test number is complete, and the indicators DL1-DL4 show "0560." The number of test times can be set renewed by pushing the third key switch K3, to reset the MCU U1. In other embodiments, the method for setting the number of test times can be adjusted by amending programs of the MCU U1 according to user preferences and requirements.

After the number of test times is set completely, the on/off test starts after a predetermined delay time by the control of the MCU U1. First, the data pin P1.6 of the MCU U1 is set at a high voltage level, such as about 5V. If the power switch pin 26 of the motherboard 20 is at about 5V, the transistor Q9 is turned off, the data pin P1.5 of the MCU U1 is at a low voltage level, such as about 0V. If the power switch pin 26 of the motherboard 20 is at about 3.3V, the transistor Q9 is turned on, the data pin P1.5 of the MCU U1 is at a high voltage level, such as about 5V. Therefore, the MCU U1 can determine the voltage level (5V or 3.3V) of the power switch pin 26 of the motherboard 20 according the voltage level of the data pin P1.5. The power pin 1 of the second standby power connector P2 receives about a 5V voltage, if the power switch pin 26 of the motherboard 20 is at about 5V. The data pin P3.0 of the MCU U1 is set at a high voltage level, such as about 5V, and the data pin P1.7 of the MCU U1 is set at a low voltage level, such as about 0V. The power pin 1 of the second standby power connector P2 receives about a 3.3V voltage, if the power switch pin 26 of the motherboard 20 is at about 3.3V, the data pin P3.0 of the MCU U1 is set at a low voltage level, such as about 0V, and the data pin P1.7 of the MCU U1 is set at a high voltage level, such as about 5V.

After the on/off test, the MCU U1 controls the indicators DL1-DL4 to show a successful time, and controls the LED D1 to shine, showing the on/off test is over. If the number indicated by the indicators DL1-DL4 is the same as the set number of test times, the motherboard 20 has been qualified under the on/off test, which is very convenient.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A computer system on/off test apparatus for a motherboard, the apparatus comprising:
a parameter setting and test control circuit comprising a micro control unit (MCU) to set a number of test times and control an on/off test of the motherboard, the parameter setting and test control circuit comprising a first standby power connector;
a test indicating circuit to display the number set by the parameter setting and test control circuit, and display a successful number of test times of the on/off test;
a voltage converting circuit to convert a first voltage received from the first standby power connector to a second voltage; and
an on/off signal switch circuit comprising a first transistor, a second transistor, a third transistor, a fourth transistor, a first resistor, a second resistor, and a second standby power connector connected to a power switch pin of the motherboard;
wherein a base of the first transistor is connected to a first data pin of the MCU, a collector of the first transistor is connected to a power pin of the first standby power connector, an emitter of the first transistor is connected to a base of the fourth transistor, a base of the second transistor is connected to a second data pin of the MCU, a collector of the second transistor is connected to an output terminal of the voltage converting circuit to receive the second voltage, an emitter of the second transistor is connected to an emitter of the fourth transistor, grounded via the first resistor, and connected to a power pin of the second standby power connector, a base of the third transistor is connected to a third data pin of the MCU, a collector of the third transistor is connected to the power pin of the first standby power connector, an emitter of the third transistor is connected to the power pin of the second standby power connector, a collector of the fourth transistor is connected to a fourth data pin of the MCU and grounded via the second resistor;
wherein the fourth transistor is turned off and the MCU controls the third transistor to be turned on in response to the power switch pin of the motherboard being at the first voltage, the fourth transistor is turned on and the MCU controls the second transistor to be turned on in response to the power switch pin of the motherboard being at the second voltage.

2. The apparatus of claim 1, wherein the parameter setting and test control circuit further comprises a first key switch, a second key switch, and a third key switch, the switches being connected to the MCU; the micro control unit (MCU) sets the number of test times through pushing the first, the second, and the third key switches.

3. The apparatus of claim 1, wherein the parameter setting and test control circuit further comprises a first light-emitting diode (LED) and a second LED, the LEDs being connected to the MCU; the first LED is operable to indicate a power status of the computer system on/off test apparatus, the second LED is operable to indicate that the on/off test is complete.

4. The apparatus of claim 1, wherein the test indicating circuit comprises four seven-segment numeric indicators connected to the MCU, to show the number of test times.

5. The apparatus of claim 1, wherein the voltage converting circuit comprises a linear regulator, an input terminal of the regulator is connected to the power pin of the first standby power connector and grounded through a first capacitor and a second capacitor in parallel; an output terminal of the regulator is connected to an adjusting terminal of the regulator through a third resistor; the adjusting terminal of the regulator is grounded through a fourth resistor; the output terminal is grounded through a third capacitor.

* * * * *